United States Patent [19]

Kaczmarek

[11] Patent Number: 4,878,146

[45] Date of Patent: Oct. 31, 1989

[54] LINE PROTECTOR

[75] Inventor: Richard Kaczmarek, Chicago, Ill.

[73] Assignee: Reliance Comm/Tec Corporation, Chicago, Ill.

[21] Appl. No.: 188,353

[22] Filed: Apr. 29, 1988

[51] Int. Cl.[4] ........ H02H 1/04

[52] U.S. Cl. ........ 361/119; 361/120; 361/426; 379/331; 379/412

[58] Field of Search ........ 361/117, 118, 119, 120, 361/126, 127, 131, 132, 426; 379/331, 412, 437

[56] References Cited

U.S. PATENT DOCUMENTS

| | | | |
|---|---|---|---|
| 4,158,869 | 6/1979 | Gilberts | 261/118 |
| 4,241,374 | 12/1980 | Gilberts | 361/124 |
| 4,447,848 | 5/1984 | Smith | 361/119 X |
| 4,710,846 | 12/1987 | Heisinger | 361/119 |
| 4,737,880 | 4/1988 | Mickelson | 361/119 |

OTHER PUBLICATIONS

Reliable Electric/Utility Products, Reliance Comm/-Tec Corporation—Catalog page D-1, entitled "Protectors and Arresters Station Equipment Single Pair Protection". Dated 1/82.

*Primary Examiner*—Derek S. Jennings
*Attorney, Agent, or Firm*—Michael M. Rickin

[57] ABSTRACT

A line protector. The protector has a conductive housing which has a surge arrester therein. The housing has an open end and a closed end. A nonconductive cap closes the open end to thereby form an enclosure. A line terminal has its shank extending outwardly from the nonconductive cap. The head of the terminal post is in the cap. The surge arrester communicates between the head and the conductive housing.

30 Claims, 8 Drawing Sheets

LINE PROTECTOR

BACKGROUND OF THE INVENTION

1. Field of the Invention

This invention relates to line protectors of the type used to protect telephone lines from spurious voltages and spurious currents.

2. Description of the Prior Art

Devices for protecting telecommunications equipment against spurious voltages and currents are generally called station protectors. There are many types of station protectors currently in use.

One such type is the R123 station protector sold by assignees Reliable Electric/Utility Products operating unit. That protector is shown in FIG. 1. Protector 1 includes a molded phenolic base 2 which has brass terminal posts 3, 4, 5. Terminal post 3 is for connection to ground, while terminal posts 4 and 5 are for connection to the two lines, also known as tip and ring, of the telephone wires entering the subscriber's premises. Protector 1 also includes screw in arresters 6, 7 each associated with a respective one of lines 4, 5. Arresters 6, 7 may be either of the carbon or gas tube type. While not shown in FIG. 1 is it well known that protector 1 also includes a ground plate in base 2.

One example of an arrester of the gas tube type is shown in U.S. Pat. No. 4,241,374 entitled "Surge Voltage Arrester With Ventsafe Feature"(hereinafter the '374 patent), which is assigned to the same assignee as is the present invention. FIG. 1 of the '374 patent is reproduced herein as FIG. 2 with essentially the same reference numerals as used in the '374 patent. The arrester shown therein includes a primary arrester which utilizes a gas tube 22 and a secondary arrester which uses an air gap 42. The arrester is contained in a sheet metal housing 12. The sidewall 14 of the housing 12 is formed with a screw thread 18 which starts at shoulder 16 of housing 12 and ends before the open end of housing 12. Screw thread 18 allows the arrester to be threaded into the associated well 8, 9 of protector 1. Well 8, 9 a portion of which is shown in FIG. 2 has an internal thread for receiving thread 18. The arrester 6, 7 can be unscrewed from its associated well 8, 9 if the arrester has shorted to ground as for example as a result of the melting of solder pellet 56. As is well known in the art, the air gap 42 of the arrester of the '374 patent provides a desired secondary surge arrester in the event of the failure of the gas tube.

Another type of station protector is that shown in U.S. Pat. No. 4,710,846 (hereinafter the '846 patent). The protector described therein is a modular unit in which two arresters are inserted. Line terminals project upwardly from the housing. A ground clip has tines which penetrate the base of the housing to hold the arresters in place. As the unit is sealed by potting compound the entire unit must be replaced if the solder pellet in either arrester melts to thereby ground the associated line.

Each arrester in the modular unit of the '846 patent is in a plastic cylindrical enclosure such that one electrode is in contact with the head of the associated line terminal and the other electrode is brought into contact with the ground clip by the associated spring and the base cup. As is well known the operation of a surge arrester results in the generation of heat. That heat should be dissipated in order to not have any potential adverse affect on the operating life and breakdown characteristics of the surge arrester. The plastic cylindrical enclosure may not allow for adequate heat dissipation. In addition, the terminal which projects outwardly from each arrester well is said to be designed so as to form a substantially air tight seal with the well.

The modular unit described in the '846 patent has a smaller base than protector 1 of FIG. 1. That smaller base may make the modular unit more suitable than protector 1 for use in many applications where physical size of the protector may be important. One such application is in the network interface devices that telephone operating companies are installing at subscriber premises.

It is desireable that a station protector be smaller than either protector 1 or the modular unit of the '846 patent. It is further desireable that the arresters used in such a protector be capable of being interconnected to each other and to ground in a variety of configurations such that maximum usage can be made of available surface area, i.e., the station protector takes up the smallest area possible. It is also desireable that each surge arrester have better heat dissipation than the arresters of the '846 patent. The protector of the present invention meets those requirements as it is comprised of two or more modular line protectors which can be arranged in a variety of configurations. In each modular line protector the surge arrester is in a conductive enclosure which is exposed to air i.e., the enclosure is not further enclosed in a nonconductive material. Thus, the modular line protector of the present invention dissipates heat faster than the arresters of the modular unit described in the '846 patent.

SUMMARY OF THE INVENTION

A line protector comprising an enclosure and a terminal post having a shank extending outwardly from the enclosure. The enclosure comprises a conductive housing which has a closed end and an open end. The enclosure also comprises a surge arresting means in the housing. It also comprises a nonconductive cap which is in assembled relationship with the housing. The cap encloses the housing's open end.

The shank of the terminal post extends outwardly from the nonconductive cap. The terminal post also has a head in the cap. The surge arresting means communicates between the head and the housing.

DESCRIPTION OF THE DRAWING

FIG. 7b is an illustrative diagram showing the surface area required for a combination of two pair of the modular protectors shown in FIG. 4a.

DESCRIPTION OF THE PREFERRED EMBODIMENTS

Figure 1:
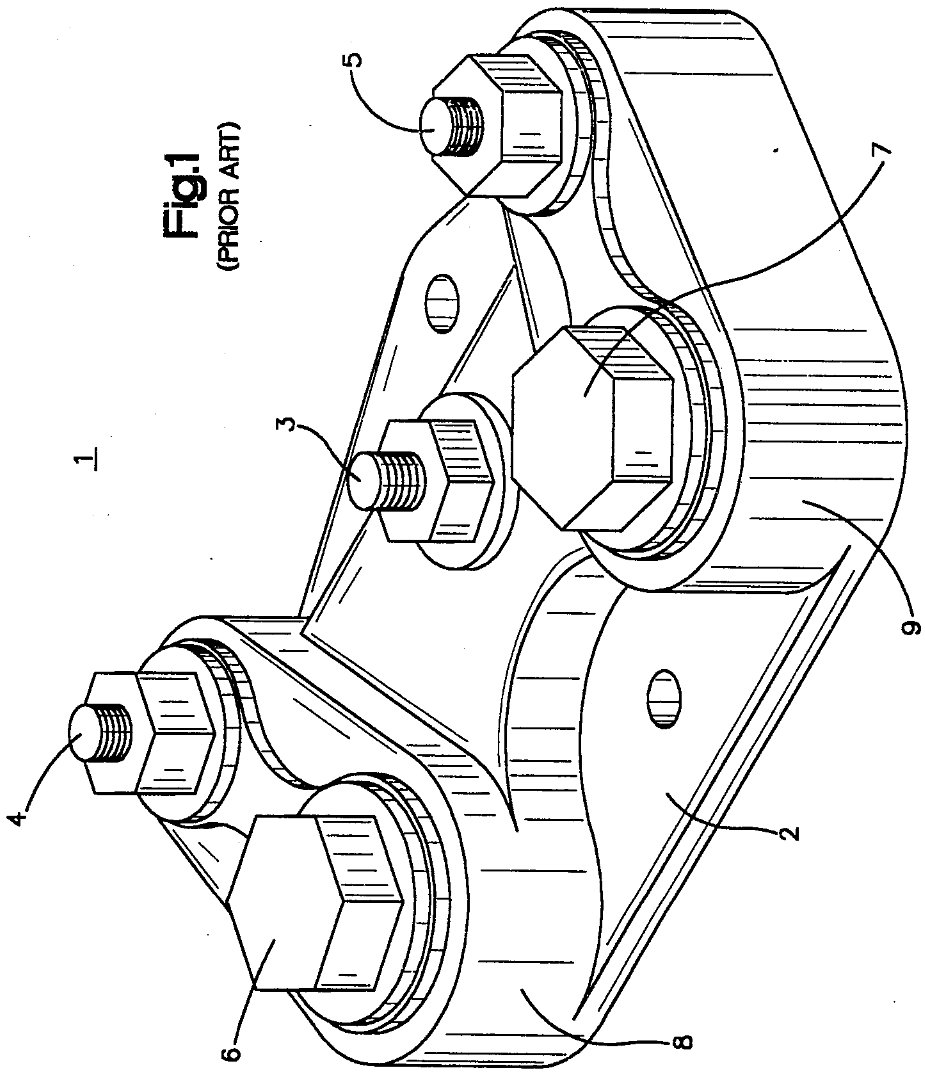
Fig.1 (PRIOR ART)
FIG. 1 shows a prior art station protector.
Figure 2:
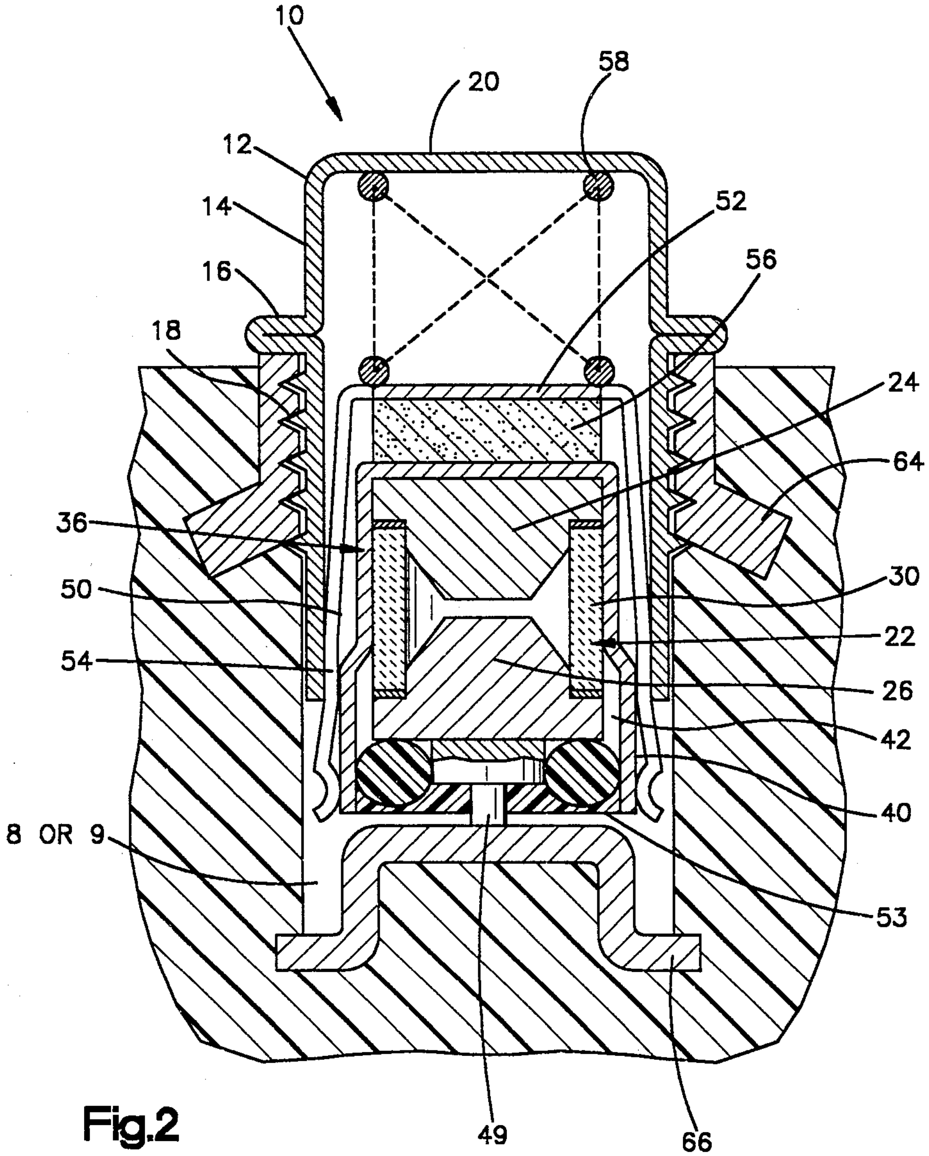
Fig.2 (PRIOR ART)
FIG. 2 shows a sectional view of another prior kart station protector.
Figure 3B:
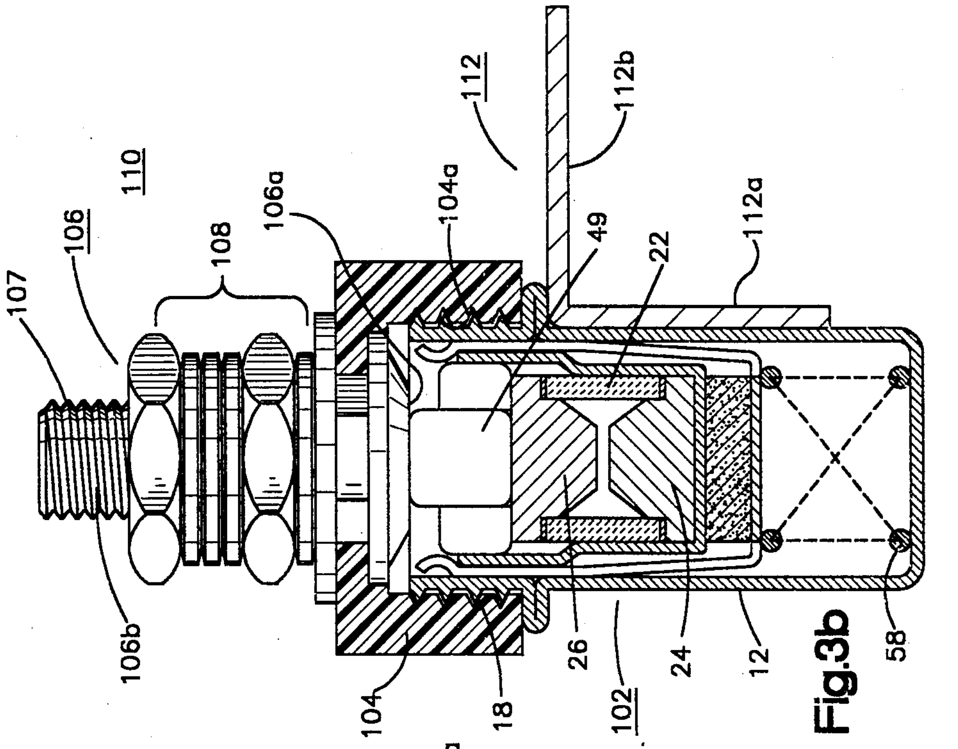
FIGS. 3*b* and 3*c* show sectional and top views, respectively, of another line protector embodied in accordance with the present invention.
Figure 3A:
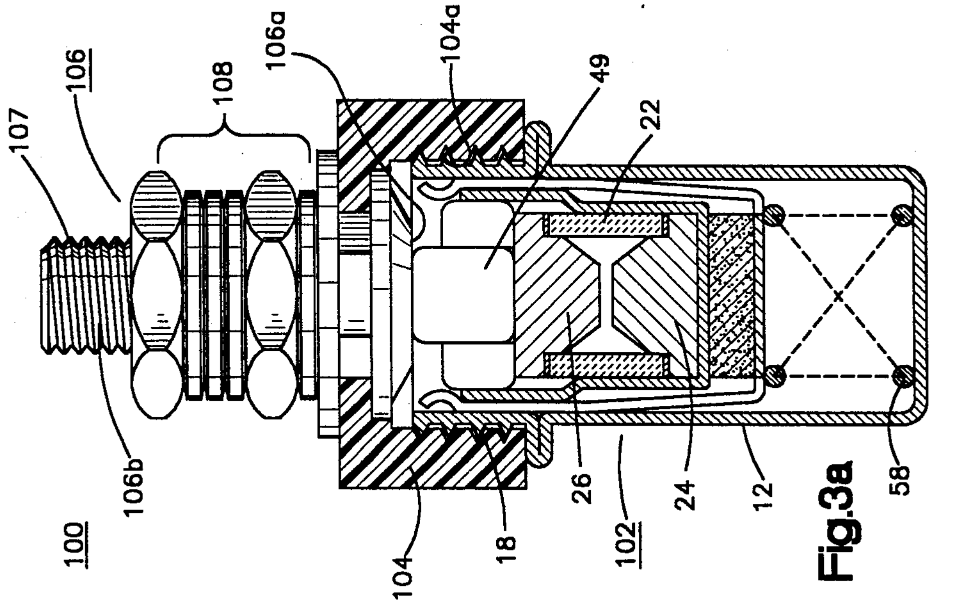
FIG. 3*a* is a sectional view of the modular line protector of the present invention.

Referring now to FIG. 3a there is shown a sectional view of the modular line protector 100 of the present invention. Protector 100 includes station protector 102 which is similar to station protector 10 of FIG. 2. Rather than being screwed into the associated one of wells 8, 9 of protector 1, protector 102 is screwed into nonconductive cap 104 which has therein an internal thread 104a for receiving thread 18 of metal housing 12.

Protector 100 further includes an insert molded terminal post 106 having a head 106a and a shank 106b. Head 106a is electrically connected to electrode 26 of gas tube 22 through cylindrical section 49. Shank 106b projects outwardly from cap 104 and has thread 107. A combination of nuts and washers indicated collectively as 108 in FIG. 3a is threaded thereon to hold in place the particular line, tip or ring, connected thereto.

Nonconductive cap 104 may be made of plastic whereas post 106 may be made of brass. A suitable adhesive such as Loctite may be applied to thread 18 to hold protector 102 in place. The adhesive also acts to environmentally seal the interior of cap 104 and housing 12.

Figure 3C:
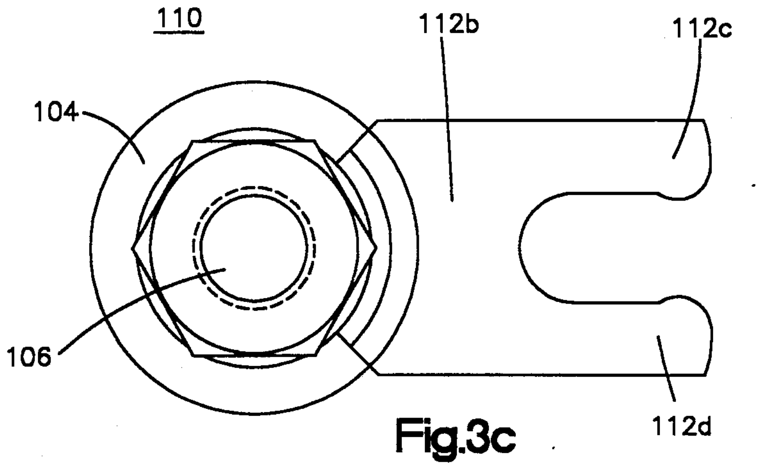

Referring now to FIGS. 3b and 3c there are shown sectional and top views, respectively, of a modular line protector 110. Protector 110 is identical in all respects to protector 100 except that protector 110 has a ground clip 112 connected to housing 12. Ground clip 112 has a first portion 112a which is substantially parallel to housing 12. Clip 112 may be connected to housing 12 by, for example, spot welding or brazing, i.e. fusing portion 112a to the housing. Clip 112 includes a right angle portion 112b which is bifurcated into forks 112c and 112d. Forks 112c and 112d are used to secure clip 112 and therefore modular line protector 110 to ground.

Figure 3D:
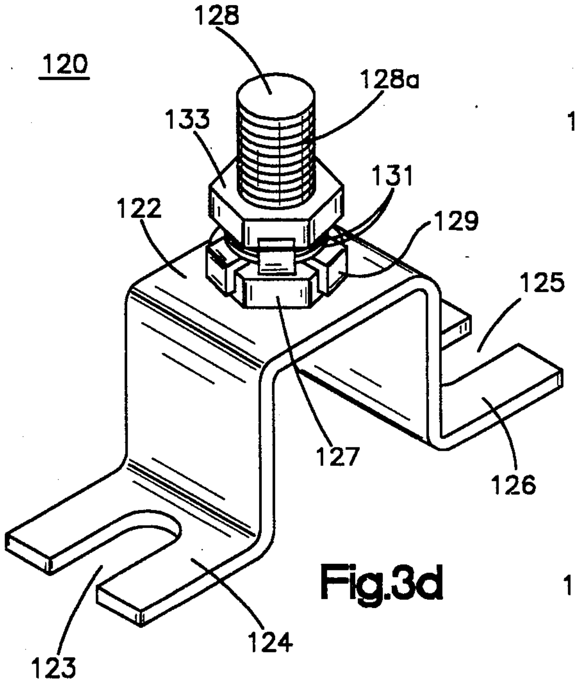
FIG. 3*d* shows an embodiment for an adaptor for use with the embodiment shown in FIGS. 3*b* and 3*c*.

That connection to ground may be obtained by securing clip 112 to an adaptor of the type shown in FIG. 3d. Adaptor 120 has a central section 122 elevated above two flanges 124 and 126, having, respectively, openings 123 and 125, through which means such as screws may be inserted for fastening adaptor 120 to a support. Central section 122 of adaptor 120 has an opening (not shown) through which a binding post 128 is inserted so that its threaded shank 128a projects outwardly. Shank 128a includes brass nut 127, pronged brass washer 129, a plurality of brass washers 131 and a brass nut 133.

Clip 112 of protector 110 may then be secured to shank 128a by nut 133. A clip 112 of a second protector 110 may also then be secured to shank 128a by nut 133. A suitable ground connection can then also be secured to shank 128a by nut 133. In this manner two such modular protectors 110 can protection for the tip and ring lines at the subscriber premises.

Figure 3E:
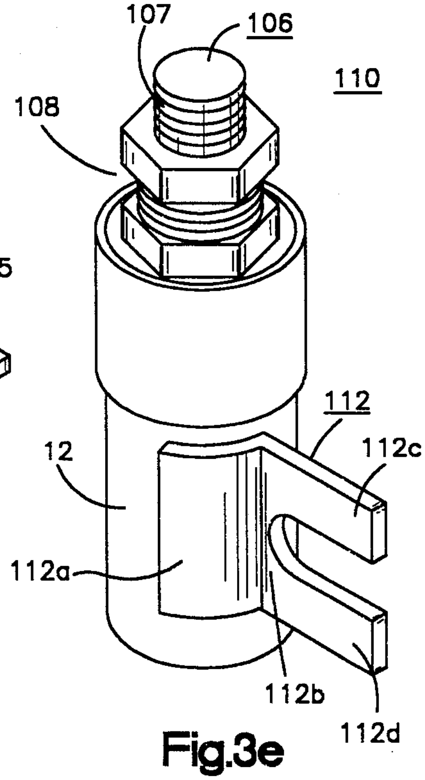
FIG. 3*e* shows an alternative embodiment for the line protector of FIGS. 3*b* and 3*c*.

Referring now to FIG. 3e there is shown an alternative embodiment for the combination of modular line protector 110 and clip 112. As with the embodiment shown in FIGS. 3b and 3c, clip 112 includes a first portion 112a which may be spot welded to housing 12 and a right angle portion 112b bifurcated into forks 112c and 112d. Clip 112 of the embodiment shown in FIG. 3e is, however, turned pb 90° clockwise as compared to clip 112 of FIGS. 3b and 3c. It should be appreciated that modular line protector 110 of FIG. 3e is otherwise identical in all respects to modular line protector 110 of FIGS. 3b and 3c.

Figure 4B:
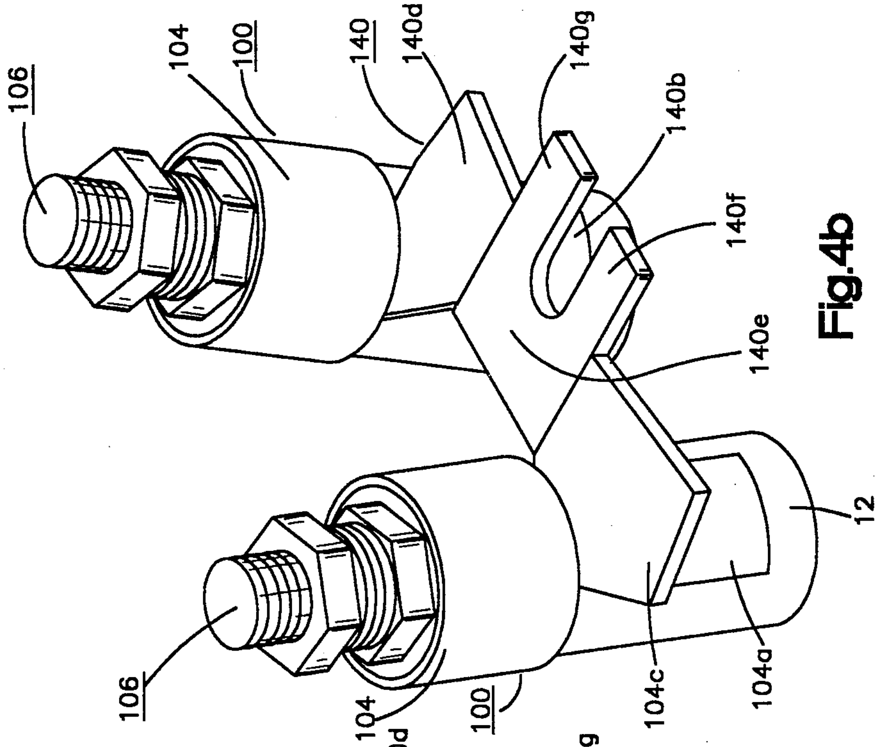
FIGS. 4*a* and 4*b* shows alternative embodiments for the combination of two of the line protectors of the present invention and a ground clip.
Figure 4A:
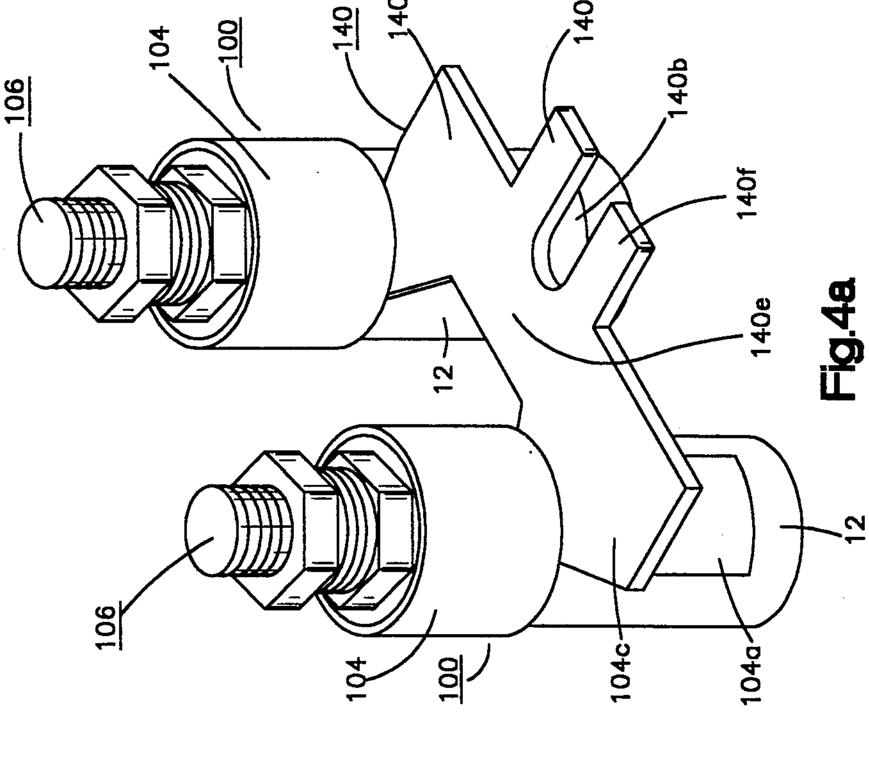

Referring now to FIGS. 4a and 4b there are shown alternative embodiments for the combination of two modular line protectors 100 and a ground clip 140. As can be seen in both figures, clip 140 has portions 140a and 140b which are connected, as for example, by spot welding to the housing 12 of an associated one of the two protectors 100. In both figures, clip 140 has portions 140c and 140d which are at right angles to portions 140a and 140b, respectively. In both figures, clip 140 also has a central portion 140e which is bifurcated into forks 140f and 140g. The principal difference between the embodiments shown in FIGS. 4a and 4b is the angular relationship between clip portion 140e and adjacent portion 140c and 140d.

In the embodiment show in FIG. 4a, portion 140e is in the same horizontal plane as portions 140c and 14d. Protectors 100 are then both at right angles to portion 140e. In the embodiment shown in FIG. 4b, portions 140c and 140d are both bent at the same acute angle away from portion 140e. This causes the end of housings 12 of protectors 100 to be relatively near to each other and the tips of terminal posts 106 to be relatively far from each other as compared to the relationship of the housing and posts for the embodiment shown in FIG. 4a. The embodiment of FIG. 4b allows more clearance for craftspersons when connecting and disconnecting lines to and from the terminal posts.

Figure 5:
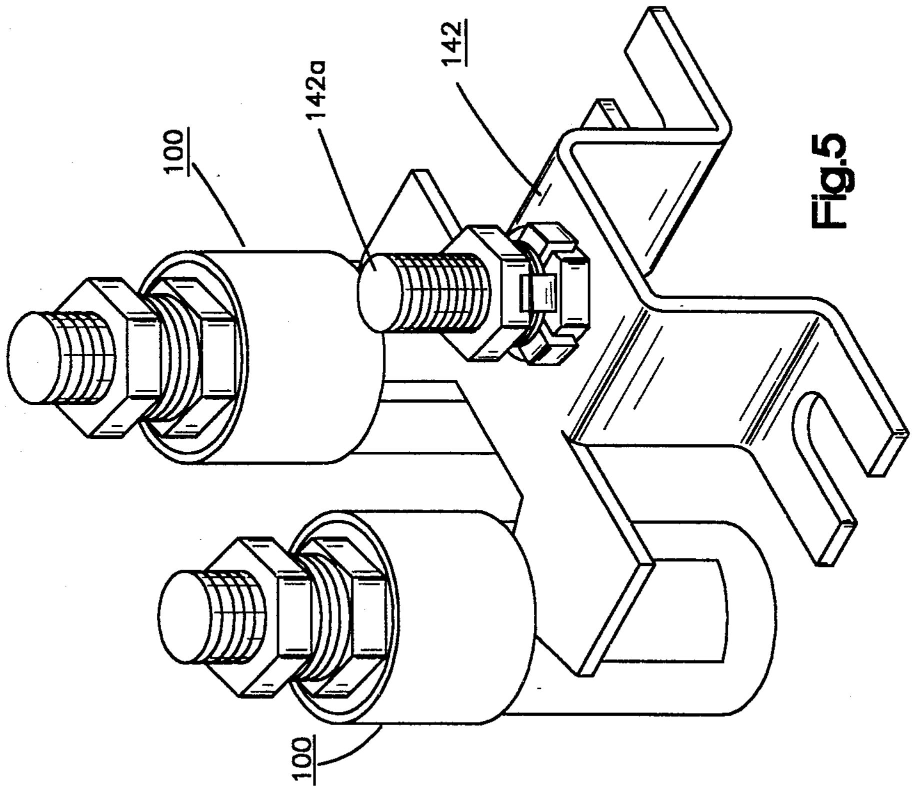
FIG. 5 shows an embodiment for the combination for two of the line protectors of the present invention and an integral adaptor.

Referring now to FIG. 5, there is shown an embodiment for two modular line protectors 100 which includes an integral adaptor 142. This embodiment represents, in effect, the combination of the embodiment shown in FIG. 4a with the adaptor 120 shown in FIG. 3d. As can be seen by comparing FIGS. 3d and 4a with FIG. 5, the integral adaptor 142 eliminates any possibility of an improper connection by a craftperson of the ground clip 140 to adaptor 120. It should be appreciated that the embodiment shown in FIGS. 3b and 3c as well as either of the embodiment shown in FIGS. 4a and 4b may at any time be connected to integral adaptor 142.

Figure 6A:
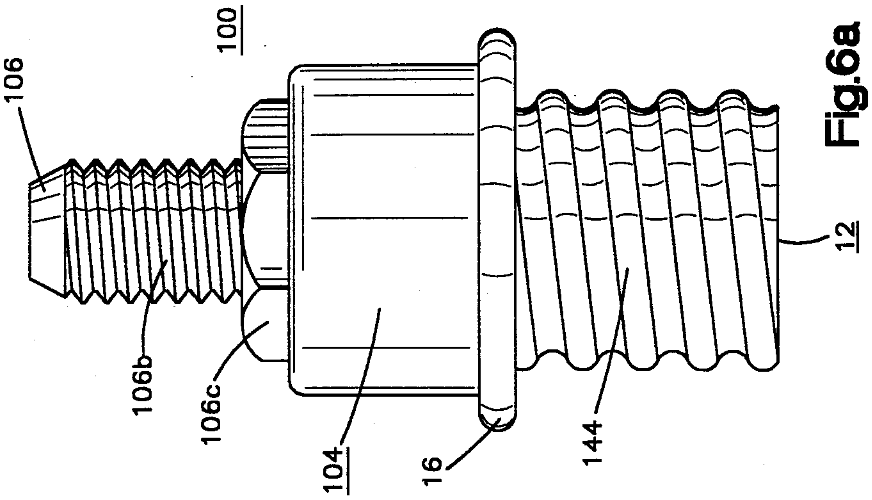
FIG. 6a shows an embodiment for the line protector of the present invention wherein the housing has screw threads on its exterior.

Referring now to FIG. 6a there is shown another embodiment for modular line protector 100. In this embodiment protector 100 also has screw threads 144 which start on the exterior of housing 12 at shoulder 16 and end before the closed end of housing 12. Screw thread 144 allows modular protector 100 to be screwed into a suitably arranged protector block, one embodiment for which is shown in FIGS. 6b and 6c.

Figure 6B:
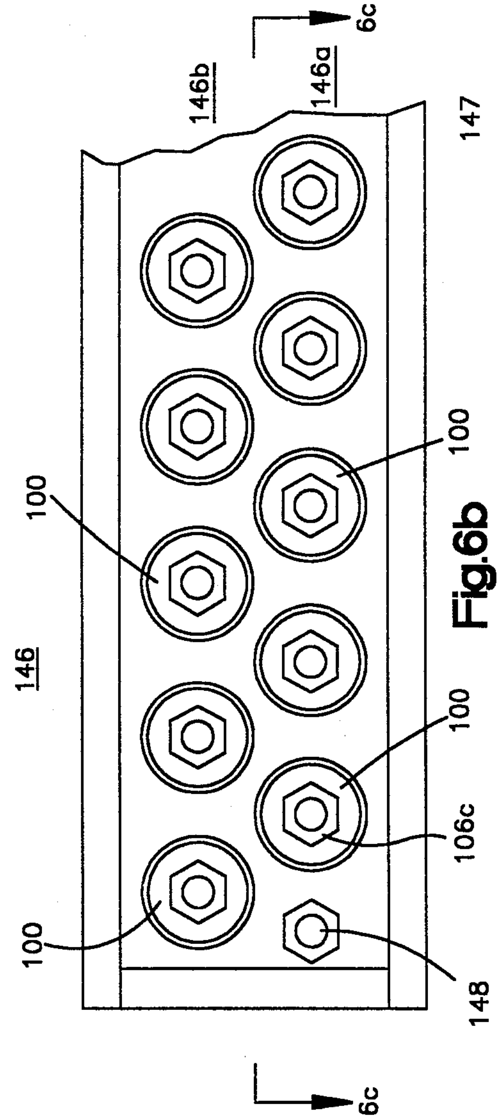
FIG. 6b and 6c show top and sectional views, respectively of a block capable of having a multiplicity of the protectors shown in FIG. 6a screwed therein.
Figure 6C:
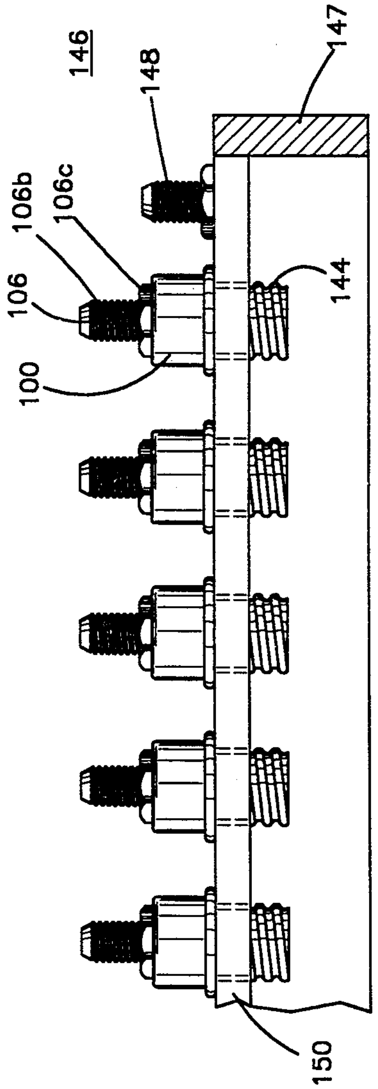
Figure 7B:
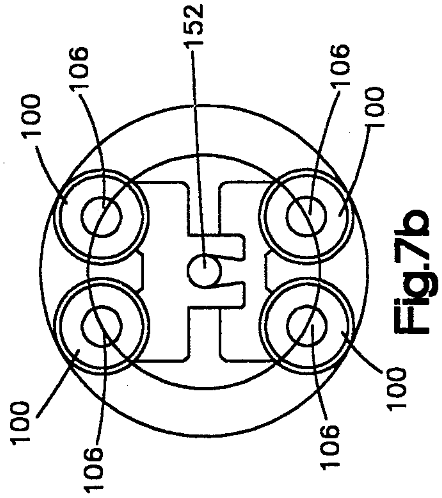
Figure 7C:
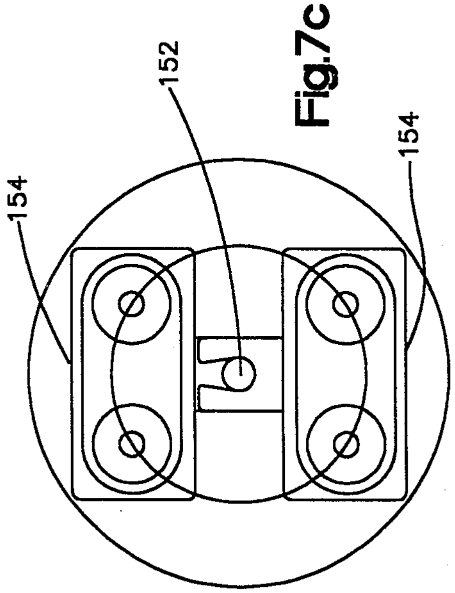
FIG. 7c is an illustrative diagram showing the surface area required for a combination of two of the modular protectors shown in the '846 patent.
Figure 7A:
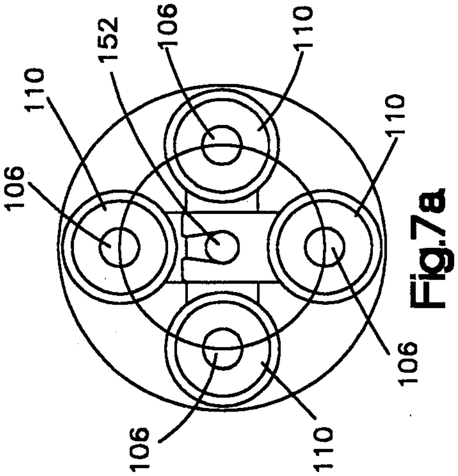
FIG. 7a is an illustrative diagram showing the surface area required for a combination of four of the modular protectors shown in FIGS. 3b and 3c.

Referring now to FIG. 6b there is shown a top view of a portion of a protector block 146 which is capable of having a multiplicity of modular protectors 100 of the type shown in FIG. 6a screwed into an associated one of a multiplicity of sockets or threaded holes arranged in two rows 146a and 146b of ground bracket 150. Ground bracket 150 can be made of brass. For ease of illustration only a part of block 146 has been shown in FIG. *6b*. As those skilled in the art will appreciate, block 146 can be designed to accomodate any number of protectors 100. Block 146 also includes a terminal post 148 secured to ground bracket 150 for connection to an external ground.

Referring now to FIG. *6c* there is shown a cross section of block 146. Block 146 has a housing 147 which is made of a nonconductive material such as plastic. A ground bracket 150 mounted in housing 147 interconnects each socket in row 146*a*. Each socket includes an internal thread for receiving thread 144 of protector 100. That internal thread is in the ground bracket 150, i.e. each socket in row 146*a* is formed in bracket 150. Ground terminal post 148 is also in direct contact with ground bracket 150 to thereby provide ground continuity between bracket 150 and the external ground connected to post 148. While not shown in FIG. *6c* it should be appreciated that each socket in row 146*b* may also be formed in bracket 150 or even in a separate bracket which would then be connected together in block 146 to bracket 150.

Protector 100 includes terminal post 106. As has been described in connection with FIG. *3a*, shank 106*b* typically has a nut shaped section 106*c* thereon. That section which may for example be hexagonal in shape, can be used as the means to apply the necessary torque to screw protector 100 into and out of its associated socket. Alternatively, nonconductive cap 104 can be suitably shaped, e.g. hexagonal, so that it can be used as the means to apply the necessary torque.

In order to further appreciate my invention reference is made to FIGS. *7a, b* and *c* wherein illustrative diagrams show the surface area required for two different embodiments made up of four modular protectors of my invention, versus the surface area required by two of the modular units described in the '846 patent. Two of those units protect four telephone wires.

More specifically, FIG. *7a* shows four of my protectors 110 of the type shown in FIGS. *3b* and *3c*. A circle with its center at the ground post 152 and passing through the centers of line terminal posts 106 of each protector 110 has a diameter of about one and one-eighth inches (about 28.58 mm). A circle with the same center and encompassing the outer periphery of all four modules has a diameter of about one and thirteen-sixteenths inches (about 46 mm). FIG. *7b* shows four of the protectors 100 of the type shown in FIG. *4a*, i.e. two pair of two modular protectors each. The diameter of the two identical circles for this four line protector are about and one-half inches (38.1 mm) and about two and one-eighth inches (about 54 mm), respectively.

The surface areas required by the four line protectors shown in FIGS. *7a* and *7b* should be compared to the surface area required by the four line protector of FIG. *7c* which is made up of two of the modular protectors 154 shown in the '846 patent. For that protector the diameter of the two circles are about one and one-half inches (38.1 mm) and about two and three-eighths inches (about 60.33 mm), respectively. In determining the diameters for the four line protector made from two of the units shown in '846 patent, two such units manufactured and sold by an operating entity of the assignee of that patent were purchased and so assembled.

There has been described a modular line protector which may take any one of a number of different embodiments. It should be appreciated that the various embodiments described herein are meant to be illustrative of the invention and are not meant to otherwise limit the scope of my invention. There are numerous other embodiments form invention that those skilled in the art will recognize as part thereof after reading this specification.

For example, the embodiments shown in FIGS. *4a* and *4b* have been shown and described as comprising three separate metallic pieces, viz. the two housing 12 for each of the protectors and the ground clip 140. Clearly the two housings and the ground clip can be made as a single piece from the same stock strip with the housings being drawn from that strip.

As another example the protector block 146 of FIG. *6b* can have its ground terminal in the center thereof. This then allows the block to assume any one of several different geometric shapes such as rectangular or circular.

While my invention may occur in numerous embodiments it should be appreciated that my invention is a modular protector for one telephone line. That modular protector includes its own surge arrestor in a conductive housing which is in assembled relationship with a nonconductive cap. Projecting outwardly from the cap is a terminal post to which the telephone line can be connected. The end of the terminal post inside the cap is in electrical connection with one electrode of the surge arrester the other electrode of which is in electrical connection with the housing. The housing may then be brought into electrical connection with ground in any way, whether of the type described herein, or some other in order to allow the modular protector to protect the telephone line against a surge thereon.

What is claimed is:

1. A line protector for a telephone line comprising:

(a) an enclosure, said enclosure comprising:

(i) a conductive housing having a first end and a second end;

(ii) surge arresting means in said housing; and (iii) a nonconductive cap in assembled relationship with said housing, said cap enclosing said second end; and (b) terminal post means having a shank extending outwardly from said nonconductive cap and a head in said cap, said surge arresting means communicating between said head and said housing.

2. The line protector of claim 1 further comprising means for connecting said conductive housing to ground in electrical contact with said housing.

3. The line protector of claim 2 wherein said ground connecting means includes means for securing said line protector to a ground conductor terminating means.

4. The line protector of claim 2 wherein said ground connecting means is fused to said conductive housing.

5. The line protector of claim 3 wherein said ground connecting means is fused to said conductive housing.

6. The line protector of claim 3 wherein said ground conductor terminating means is a binding post of an adaptor.

7. The line protector of claim 2 wherein said ground connecting means are screw threads on the exterior of said housing.

8. The line protector of claim 1 wherein said surge arresting means has at least tow electrodes one of which is adjacent to said first end and in electrical contact therewith and the other of which is adjacent to said second end and in electrical contact with said terminal post means head.

9. The line protector of claim 8 wherein said surge arresting means is a gas tube.

10. A line protector comprising:

(a) surge arrester means in a conductive housing, said housing having a first end and a said end, said surge arrester means having at least two electrodes one of which is adjacent to said first end and in electrical contact therewith and the other of which is accessible through said second end;

(b) a nonconductive cap in assembled relationship with said housing to form an enclosure, said cap enclosing said conductive housing second end; and (c) terminal post means having a shank extending outwardly from said nonconductive cap and a head in said cap in electrical contact with said other electrode accessible through said conductive housing second end.

11. The line protector of claim 10 further comprising means for connecting said conductive housing to ground in electrical contact with said housing.

12. The line protector of claim 11 wherein said ground connecting means includes means for securing said line protector to a ground conductor terminating means.

13. The line protector of claim 11 wherein said ground connecting means is fused to said conductive housing.

14. The line protector of claim 11 wherein said ground connecting means are screw threads on the exterior of said housing.

15. The line protector of claim 11 wherein in said surge arrester means is a gas tube.

16. An assembly comprising:

(1) at least two line protectors, each of said protectors comprising:

(a) an enclosure, said enclosure comprising:

(i) a conductive housing having a first end and a second end;

(ii) surge arresting means in said housing; and (iii) a nonconductive cap in assembled relationship with said housing, said cap enclosing said second end; and (b) terminal post means having a shank extending outwardly from said nonconductive cap and a head in said cap, said surge arresting means communicating between said head and said housing; and (2) means in electrical contact with each of said at least two line protector housing for connecting each of said protectors to ground.

17. The assembly of claim 16 wherein said ground connecting means includes means for securing said protectors to a ground conductor terminating means.

18. The assembly of claim 16 wherein said ground connecting means is fused to each of said at least two protector housings.

19. The assembly of claim 17 wherein said ground connecting means is fused to each of said at least two protector housings.

20. The assembly of claim 17 wherein said ground conductor terminating means is a binding post of an adaptor.

21. The assembly of claim 16 wherein said ground connecting means includes an adaptor having a binding post.

22. The assembly of claim 16 wherein each of said surge arresting means have at least two electrodes one of which is adjacent to said housing first end and in electrical contact therewith and the other of which is adjacent to said second end and in electrical contact with said terminal post means head.

23. The assembly of claim 22 wherein each of said surge arresting means is a gas tube.

24. The assembly of claim 16 wherein said ground connecting means and each of said at least two conductive housings are a single unitary structure.

25. A protector block for use in receiving at least on e line protector, said protector comprising an enclosure, said enclosure comprising a conductive housing having a second end and a first end; surge arresting means in said housing; and a nonconductive cap in assembled relationship with said housing, said cap enclosing said second end; and terminal spot means having a shank extending outwardly from said nonconductive cap and a head in said cap, said surge arresting means communicating between said head and said housing; said protector block comprising:

(a) a nonconductive housing;

(b) a conductive bracket mounted in said housing, said bracket having at least one socket adapted for receiving said at least one line protector such that said conductive housing is in electrical contact with said bracket when said protector is received therein; and (c) terminal post means extending outwardly from said housing and connected to said bracket, said terminal post means adapted for connection to an external ground.

26. The protector block of claim 25 wherein said conductive housing has a screw thread on the exterior thereof and said socket has an internal thread such that said line protector can be threaded into and out of said socket.

27. The protector block of claim 25 wherein said bracket includes a multiplicity of sockets each adapted for receiving said line protector such that said conductive housing is in electrical contact with said bracket when said line protector is received in only one of said multiplicity of sockets.

28. A combination comprising a protector block and at least one line protector, comprising:

(1) said at least one line protector comprising:

(a) an enclosure, said enclosure comprising:

(i) a conductive housing having a first end and a second end;

(ii) surge arresting means in said housing; and (iii) a nonconductive cap in assembled relationship with said housing, said cap enclosing said second end; and (b) terminal post means having a shank extending outwardly from said nonconductive cap and a head in said cap, said surge arresting means communicating between said head and said housing;

(2) said protector block comprising:

(a) a nonconductive housing;

(b) a conductive bracket in said housing, said bracket having at least one socket adapted for receiving said at least one line protector such that said conductive housing is in electrical contact with said bracket when said line protector is received therein; and (c) terminal post means extending outwardly from said housing and connected to said bracket, said terminal post means adapted for connection to an external ground.

29. The combination of claim 28 wherein said at least one line protector conductive housing has a screw thread on the exterior thereof and said protector block socket has an internal thread such that said line protector can be threaded into and out of said socket.

30. The combination of claim 28 wherein said protector block bracket includes a multiplicity of sockets such adapted for receiving said line protector such that said conductive housing is in electrical contact with said bracket when said line protector is received in any one of said multiplicity of sockets.

* * * * *